(12) United States Patent
Stoeger

(10) Patent No.: US 10,816,049 B2
(45) Date of Patent: Oct. 27, 2020

(54) BRAKE CALIPER MADE FROM CAST IRON OF A DISC BRAKE

(71) Applicant: KNORR-BREMSE Systeme fuer Nutzfahrzeuge GmbH, Munich (DE)

(72) Inventor: Christian Stoeger, Osterhofen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 196 days.

(21) Appl. No.: 15/581,991

(22) Filed: Apr. 28, 2017

(65) Prior Publication Data

US 2017/0234382 A1    Aug. 17, 2017

Related U.S. Application Data

(63) Continuation of application No. PCT/EP2015/073464, filed on Oct. 9, 2015.

(30) Foreign Application Priority Data

Oct. 30, 2014   (DE) .......................... 10 2014 115 764

(51) Int. Cl.
*F16D 65/00* (2006.01)
*F16D 55/226* (2006.01)
(Continued)

(52) U.S. Cl.
CPC ....... *F16D 65/0068* (2013.01); *F16D 55/226* (2013.01); *F16D 55/227* (2013.01);
(Continued)

(58) Field of Classification Search
CPC .. F16D 65/0075; F16D 55/227; F16D 65/183; F16D 2200/0013; F16D 2121/14;
(Continued)

(56) References Cited

U.S. PATENT DOCUMENTS 4,034,857 A * 7/1977 Kondo .................. F16D 55/227
                                                    188/73.36
5,111,914 A * 5/1992 Thiel ..................... F16D 55/227
                                                    188/73.1
(Continued)

FOREIGN PATENT DOCUMENTS

DE      10 2008 055 860 A1     5/2010
DE      10 2009 058 604 A1     7/2011
(Continued)

OTHER PUBLICATIONS

Cover page of EP 1 805 429 A1 published Jul. 11, 2007 (one (1) page).
(Continued)

*Primary Examiner* — Robert A. Siconolfi
*Assistant Examiner* — San M Aung
(74) *Attorney, Agent, or Firm* — Crowell & Moring LLP

(57) ABSTRACT

A cast iron brake caliper of a disc brake, includes a caliper back and caliper head connected to the caliper back via tension struts arranged parallel and spaced apart from one another. The caliper head has a housing surrounding an accommodation chamber for functional parts and, separate from and adjacent to the housing, an integrally molded, protruding connector, which accommodates a bearing bore for a fixed bearing, and is connected to the housing by way of an integrally molded rib. The brake caliper is designed such that the rib is guided across the connector up to and into an outer edge region of the caliper head.

8 Claims, 3 Drawing Sheets

(51) Int. Cl.
| | |
|---|---|
| *F16D 55/227* | (2006.01) |
| *F16D 65/18* | (2006.01) |
| *F16D 65/56* | (2006.01) |
| *F16D 55/00* | (2006.01) |
| *F16D 121/14* | (2012.01) |
| *F16D 125/64* | (2012.01) |
| *F16D 125/26* | (2012.01) |

(52) U.S. Cl.
CPC ....... *F16D 65/0075* (2013.01); *F16D 65/183* (2013.01); *F16D 65/568* (2013.01); *F16D 2055/0016* (2013.01); *F16D 2121/14* (2013.01); *F16D 2125/26* (2013.01); *F16D 2125/64* (2013.01); *F16D 2200/0013* (2013.01)

(58) Field of Classification Search
CPC ............... F16D 2125/64; F16D 55/226; F16D 65/0068; F16D 65/568; F16D 2055/0016; F16D 2125/26; F16D 55/02; F16D 65/092; F16D 65/095; F16D 2055/0008; F16D 2250/00; F16D 2250/0092
USPC ..... 188/73.31, 73.1, 71.1, 250 R, 370, 18 A; D12/180
See application file for complete search history.

(56) References Cited

U.S. PATENT DOCUMENTS

| | | | | |
|---|---|---|---|---|
| 6,247,561 | B1 * | 6/2001 | Doi | F16D 55/22655 188/73.39 |
| D506,714 | S * | 6/2005 | Ono | D12/180 |
| D508,001 | S * | 8/2005 | Matsumoto | D12/180 |
| 7,232,015 | B1 * | 6/2007 | Umehara | F16D 55/226 148/538 |
| 8,161,614 | B2 * | 4/2012 | Plantan | B23P 9/04 188/71.1 |
| 2005/0014393 | A1 * | 1/2005 | Cortinovis | F16D 66/021 439/34 |
| 2006/0219490 | A1 * | 10/2006 | Eisengraber | F16D 65/0006 188/71.1 |
| 2006/0231353 | A1 * | 10/2006 | Gilliland | F16D 55/228 188/73.31 |
| 2008/0029351 | A1 * | 2/2008 | Gruber | F16D 65/092 188/18 A |
| 2011/0005872 | A1 * | 1/2011 | Baumgartner | F16D 65/0978 188/73.31 |
| 2011/0127120 | A1 | 6/2011 | Stumpf et al. | |
| 2012/0073912 | A1 * | 3/2012 | Camilo-Martinez | F16D 65/568 188/71.7 |
| 2014/0262638 | A1 * | 9/2014 | Scheibe | F16D 65/12 188/73.47 |
| 2017/0159732 | A1 * | 6/2017 | Klingner | F16D 55/226 |

FOREIGN PATENT DOCUMENTS

| | | |
|---|---|---|
| DE | 10 2012 006 093 A1 | 9/2013 |
| DE | 10 2013 100 173 A1 | 7/2014 |
| EP | 1 462 671 A1 | 9/2004 |
| EP | 2 644 927 A1 | 10/2013 |
| WO | WO 2006/042726 A1 | 4/2006 |
| WO | WO 2015/114353 A1 | 8/2015 |
| WO | WO 2016/034377 A1 | 3/2016 |

OTHER PUBLICATIONS

International Search Report (PCT/ISA/210) issued in PCT Application No. PCT/EP2015/073464 dated Jan. 22, 2016 with English-language translation (six (6) pages).

German-language Written Opinion (PCT/ISA/237) issued in PCT Application No. PCT/EP2015/073464 dated Jan. 22, 2016 (four (4) pages).

German-Language European Office Action issued in counterpart European Application No. 15 778 660.9 dated Feb. 7, 2019 (four (4) pages).

\* cited by examiner

BRAKE CALIPER MADE FROM CAST IRON OF A DISC BRAKE

CROSS REFERENCE TO RELATED APPLICATIONS

This application is a continuation of PCT International Application No. PCT/EP2015/073464, filed Oct. 9, 2015, which claims priority under 35 U.S.C. § 119 from German Patent Application No. 10 2014 115 764.8, filed Oct. 30, 2014, the entire disclosures of which are herein expressly incorporated by reference.

BACKGROUND AND SUMMARY OF THE INVENTION

The invention relates to a brake caliper, composed of cast iron, of a disc brake. The brake caliper has a caliper rear section and a caliper head which is connected to the caliper rear section by tension struts arranged parallel to and spaced apart from one another. The caliper head has a housing which encloses a receiving chamber for functional parts. The caliper head has, spaced apart from and adjacent to the housing, an integrally formed, protruding connector which accommodates a bearing bore for a fixed bearing.

A brake caliper of this type serves, firstly, for the mounting of functional parts which are required for the operation of the disc brake, and, secondly, for handling forces that arise during braking operations.

The functional parts include, inter alia, a brake-application device which is arranged in the receiving chamber, enclosed by a housing of the brake caliper, wherein the housing is a constituent part of a caliper head, whilst opposite, there is formed a caliper rear section, on which a reaction-side brake pad is supported.

The caliper head and the caliper rear section are connected to one another by way of two tension struts. These two struts are arranged parallel to and spaced apart from one another and laterally delimit the brake caliper.

The brake application device includes a pneumatically or electromechanically pivotable brake lever which is supported at one side on the caliper head and at the other side on a bridge. The brake application device has at least one brake plunger by means of which an application-side brake pad can be pressed against a vehicle-side brake disc.

Here, during actuation of the brake, that is to say during a pivoting of the brake lever, the bridge (and thus the brake plunger) are pressed against the brake pad and, as a result, against the brake disc, whereupon, in the case of a brake caliper in the form of a sliding caliper, the reaction forces that arise cause the brake caliper to be displaced, driving the reaction-side brake pad with it, in the direction of the brake disc, until both brake pads bear against the brake disc to perform braking action.

The brake caliper must therefore exhibit adequate strength to be able to accommodate the forces that arise. For this purpose, the known brake caliper is formed in one piece as a cast part, and is dimensioned correspondingly.

However, the brake-application force, applied during braking operations, in the brake caliper leads to a deformation which gives rise to stresses. For operational reliability, the brake caliper must be designed so as to withstand a defined number of load cycles of dynamic loading before material fracture occurs.

As has been found, it is the case in particular that regions of the brake caliper situated in the caliper head are subject to particularly high load, which regions commonly form a starting point for a crack in the brake caliper.

For fastening the brake caliper to a positionally fixed, vehicle-side brake carrier, fastening elements are provided. These fastening elements are designed as plain bearings, one of which functions as a floating bearing and the other of which functions as a fixed bearing. The fastening elements each have a guide bar held on the brake carrier, on which guide bar the brake caliper is mounted so as to be displaceable axially relative to the brake disc.

Here, the fixed bearing performs substantially a guidance function, whereas the floating bearing serves for the compensation of tolerances. The guide bars are in each case mounted in a guide bushing of the brake caliper, which guide bushing is held in axially secured fashion in the brake caliper in a bearing bore.

To obtain an adequate guidance length, the bearing bore is provided in a connector which protrudes beyond the caliper head and which is connected to the housing by way of a rib. The housing is situated adjacent and spaced apart from the connector.

The invention is based on the object of further developing a brake caliper of the above type such that, with little outlay in terms of construction and manufacture, the load capacity thereof is increased, and the service life is lengthened.

This object is achieved by a brake caliper that having a caliper rear section and a caliper head which is connected to the caliper rear section by tension struts arranged parallel to and spaced apart from one another. The caliper head has a housing which encloses a receiving chamber for functional parts. The caliper head has, spaced apart from and adjacent to the housing, an integrally formed, protruding connector which accommodates a bearing bore for a fixed bearing. The connector is connected by an integrally formed rib to the housing, wherein the rib is extended across the connector into an outer edge region of the caliper head As has surprisingly been discovered, the design of the brake caliper according to the invention, in the case of which the rib is extended across the connector into an outer edge region of the caliper head, results in the above described problem zones being relieved of load to such an extent that the risk of crack formation in the highly loaded region is minimized, at least to such an extent that such crack formation first commences, if at all, after a considerably longer usage duration of the disc brake, that is to say after a considerably greater number of load cycles.

Here, it must be emphasized in particular that the structural design can, in the context of the invention, be realized in practically cost-neutral fashion, because only an adaptation of the casting mold is necessary. The additional usage of cast-iron material is negligible in terms of costs.

According to a further concept of the invention, the rib has a two-step form in the manner of a staircase, wherein each step surface, as it were, extends across the connector into an outer edge region of the caliper head.

The rib is at least partially dimensioned in terms of its height, in the region between the connector and the housing, so as to extend over a major part of the outer circumference of the connector, and is at the other side connected to the housing.

The rib, proceeding from the housing, preferably extends obliquely across the connector to the tension strut, that is to say into an end region, facing toward the tension strut, of the caliper head.

In principle, by way of the invention, a loading-optimized brake caliper is realized which exhibits the greatest possible strength in all relevant regions with the least possible material usage.

The thus filigree form of the brake caliper ultimately also leads to a minimization of weight, a constant demand which is met by the invention in an impressive manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
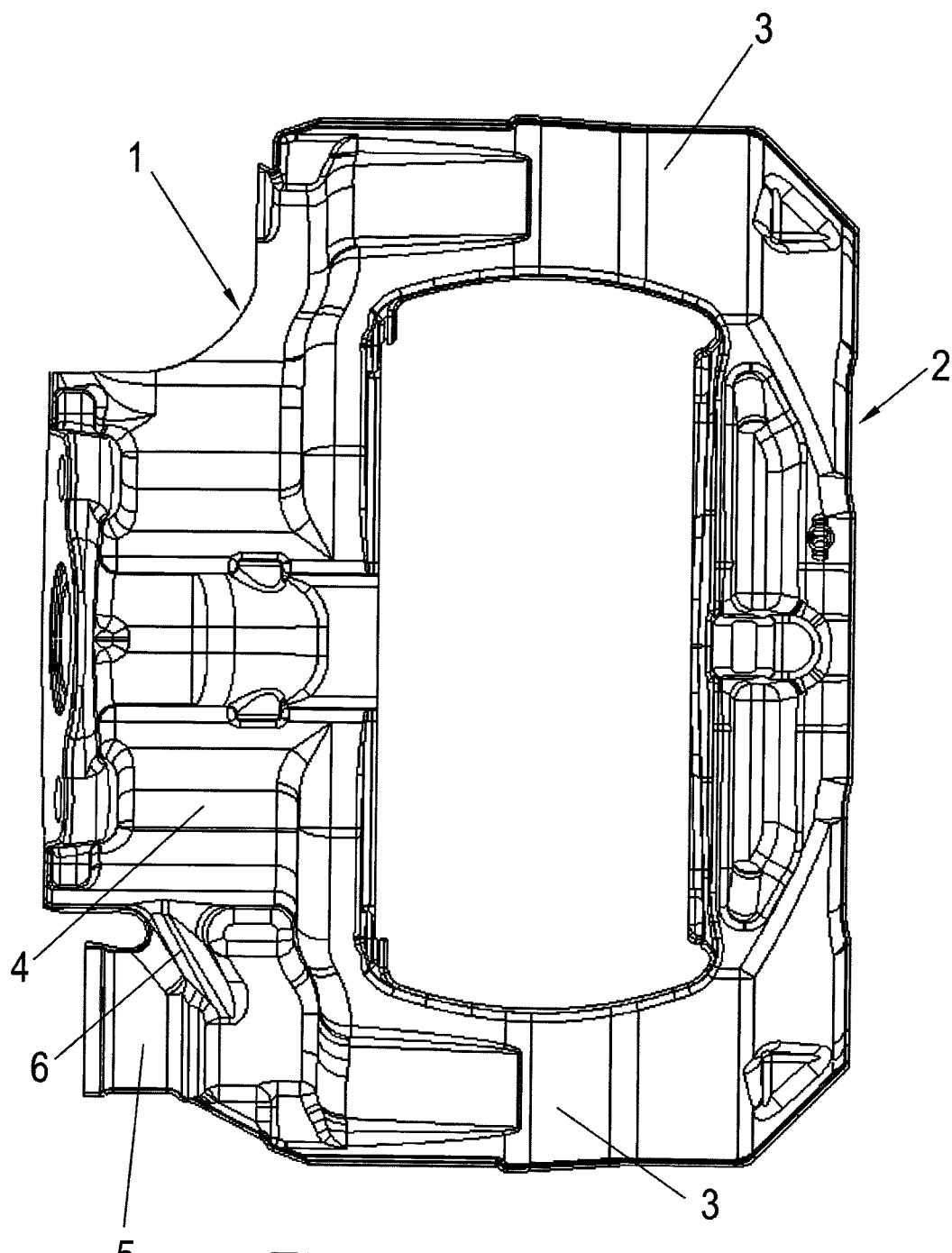
FIG. 1 shows a brake caliper according to the prior art in a plan view.
Figure 2:
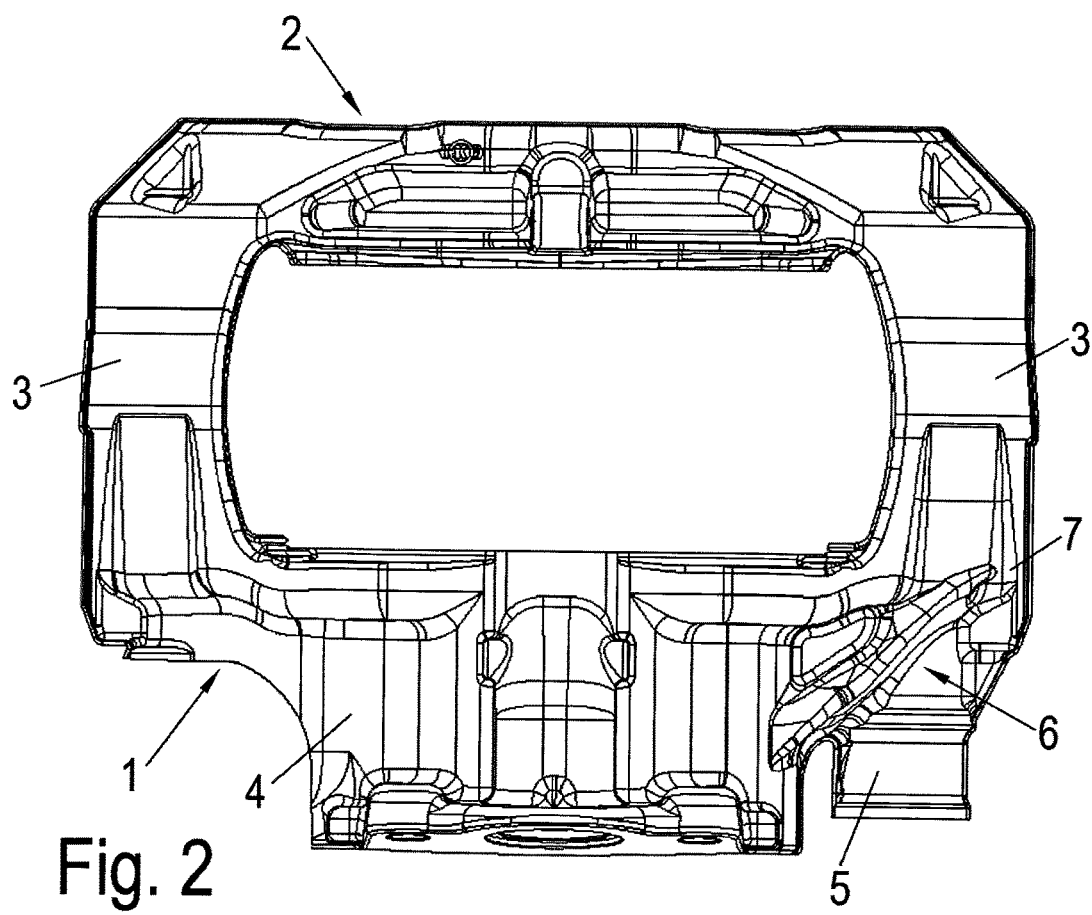
FIG. 2 shows a brake caliper according to an embodiment of the invention, likewise in a plan view.

FIG. 1 shows a brake caliper according to prior art, which corresponds in terms of its basic construction to that according to the invention as per FIG. 2.

Here, the brake caliper is composed of a caliper head 1 with a housing 4 which encloses a receiving chamber for functional parts, of an oppositely situated caliper rear section 2, and of two tension struts 3 which are arranged parallel to and spaced apart from one another and which connect the caliper head 1 and the caliper rear section 2 to one another.

To receive a plain bearing which is in the form of a fixed bearing and which, together with a further floating bearing (not illustrated), serves for the fastening of the brake caliper to a vehicle-side brake carrier, a connector 5 with a bearing bore 8 is integrally formed on the brake caliper. The brake caliper is held in the form of a sliding caliper in a displaceable fashion. The connector 5 protrudes from and extends with a spacing with respect to the housing 4.

To accommodate deformation forces acting on the brake caliper during braking operations, the connector 5 is connected by way of an integrally formed rib 6 to the housing 4. As can be seen very clearly in FIG. 1, in the case of a known brake caliper, the rib 6 extends from the housing 4 into a central region of the connector 5, that is to say approximately to the central axis thereof.

Figure 3:
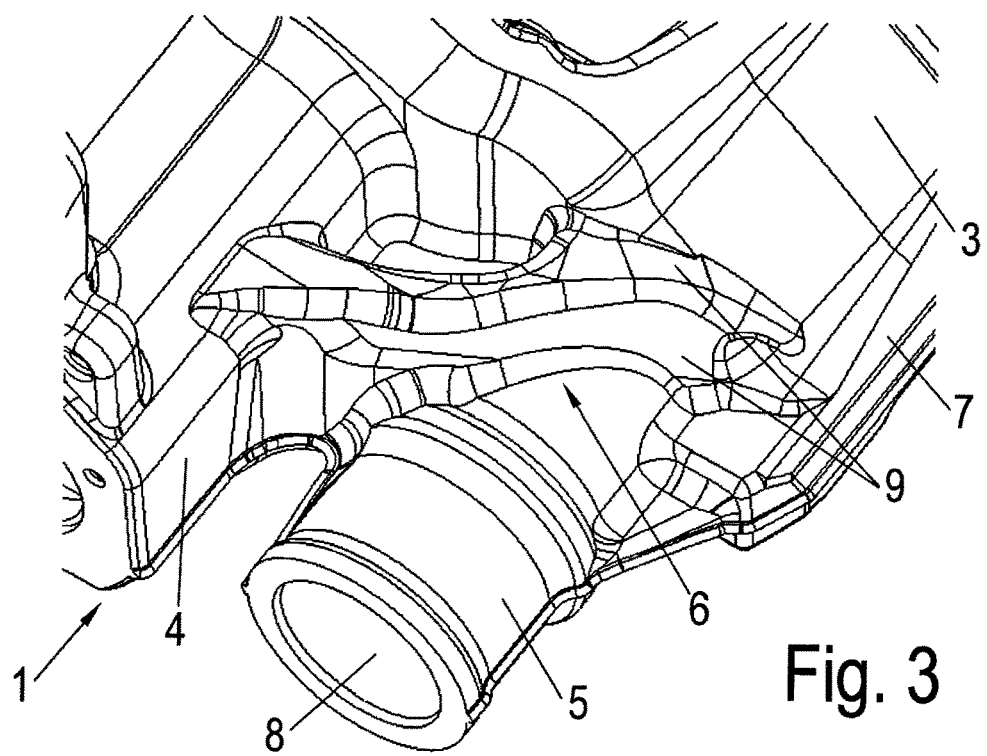
FIG. 3 shows a partial detail of the brake caliper according to FIG. 1 in a perspective view.
Figure 4:
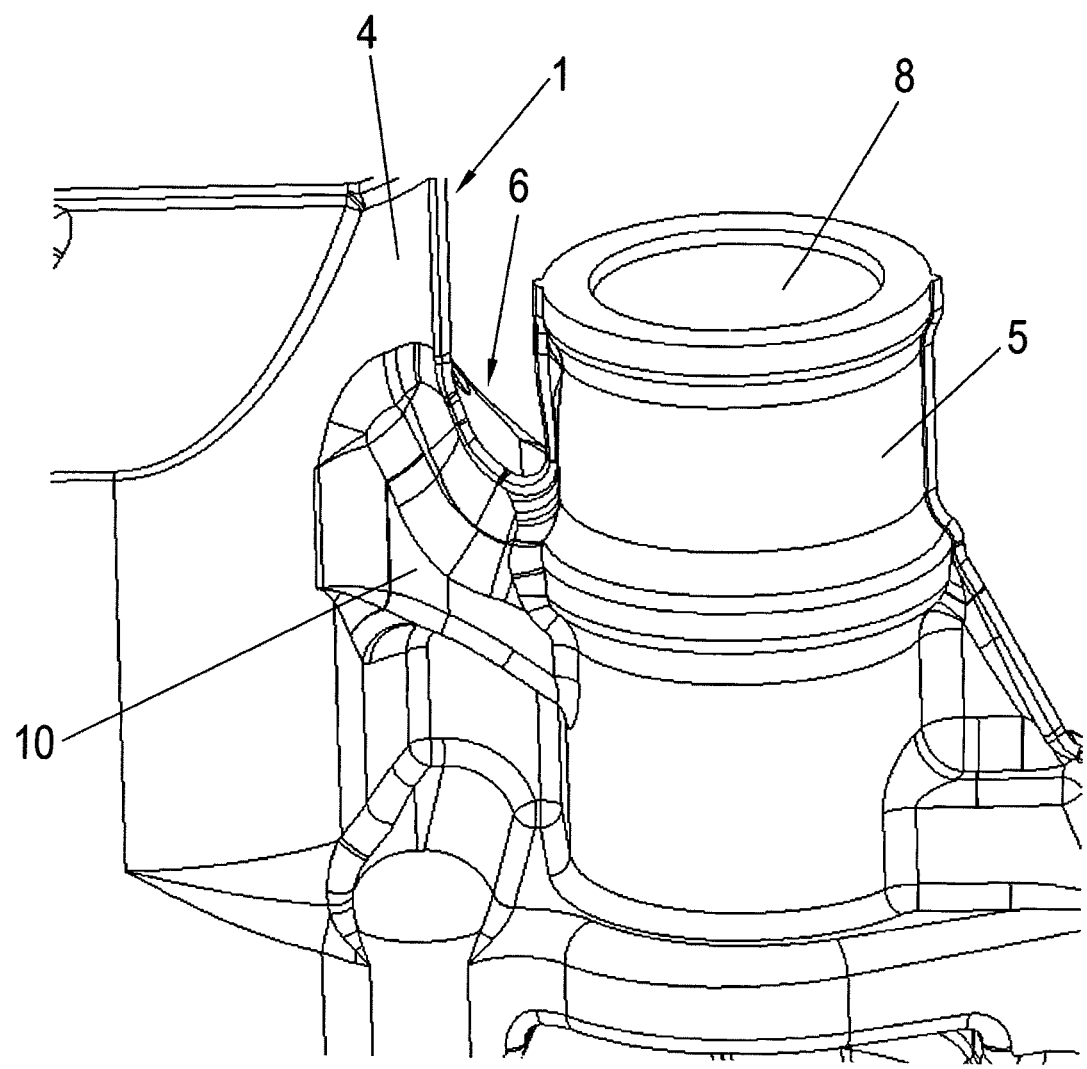
FIG. 4 shows the partial detail as per FIG. 3 in a view from below.

By contrast, the rib 6 according to the invention extends, as can be seen in FIGS. 2-4, across the connector 5 into an outer edge region 7 of the caliper head 1. The rib 6, as in the prior art, is in this case also positioned on the top side of the brake caliper in an installed position.

In particular, it can be seen from FIG. 3 that the rib 6 is of two-step form in the manner of a staircase, with two step surfaces 9 which both extend into the edge region 7.

FIG. 4 shows a partial detail of the brake caliper in a view from below. It can be seen in this figure that the rib 6 is formed, in the spacing region between the housing 4 and the connector 5, as a thickened portion 10, the height of which is dimensioned so as to cover a relatively large part of the circumference of the connector 5. The thickened portion 10 is a constituent part of a first step of the rib 6, which bears directly against the connector 5.

With regard to the width of the thickened portion 10, that is to say the spacing between the housing 4 and the connector 5, the thickened portion narrows from the top side, that is to say from the lower step surface 9, toward the bottom side. An optimization between material usage and load capacity is thus achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cast iron brake caliper of a disc brake, comprising:
a caliper rear section;
a caliper head;
tension struts arranged parallel to and spaced apart from one another, the caliper head being connected to the caliper rear section via the tension struts,
wherein
the caliper head has a housing that encloses a receiving chamber for functional parts,
the caliper head has an integrally formed, protruding connector which accommodates a bearing bore for a fixed bearing, the connector being adjacent to and spaced apart from the housing of the caliper head,
the connector is connected to the housing via an integrally formed rib,
the rib extends from a central portion of the housing completely across the connector into an outer edge region of the caliper head on a side of the connector opposite a side of the connector facing the housing,
the rib has a thickened portion in a spaced apart region between the connector and the housing, a thickness of the thickened portion being thicker than a thickness of material between a lateral side of the rib and a region of the housing facing the lateral side of the rib, and
the brake caliper is formed in one piece as a cast part.

2. The brake caliper as claimed in claim 1, wherein the rib runs obliquely as far as an adjacent one of the tension struts.

3. The brake caliper as claimed in claim 1, wherein the rib has a multi-step form with step surfaces.

4. The brake caliper as claimed in claim 3, wherein the multi-step form is a two-step form.

5. The brake caliper as claimed in claim 2, wherein the rib has a multi-step form.

6. The brake caliper as claimed in claim 1, wherein the thickened portion tapers toward a bottom side of the caliper.

7. The brake caliper as claimed in claim 1, wherein the thickened portion is dimensioned in terms of height so as to cover a major part of a circumference of the connector.

8. The brake caliper as claimed in claim 6, wherein the thickened portion is dimensioned in terms of height so as to cover a major part of a circumference of the connector.

* * * * *